(12) United States Patent
Shao et al.

(10) Patent No.: US 11,192,091 B2
(45) Date of Patent: Dec. 7, 2021

(54) PALLADIUM-RUTHENIUM ALLOYS FOR ELECTROLYZERS

(71) Applicant: The Hong Kong University of Science and Technology, Hong Kong (CN)

(72) Inventors: Minhua Shao, Hong Kong (CN); Lulu Zhang, Hong Kong (CN)

(73) Assignee: The Hong Kong University of Science and Technology, Hong Kong (CN)

(*) Notice: Subject to any disclaimer, the term of this patent is extended or adjusted under 35 U.S.C. 154(b) by 54 days.

(21) Appl. No.: 16/362,365

(22) Filed: Mar. 22, 2019

(65) Prior Publication Data
US 2020/0298211 A1    Sep. 24, 2020

(51) Int. Cl.
| | |
|---|---|
| B01J 23/46 | (2006.01) |
| B01J 37/16 | (2006.01) |
| H01M 8/1004 | (2016.01) |
| H01M 4/92 | (2006.01) |
| C01B 3/02 | (2006.01) |
| H01M 4/86 | (2006.01) |

(52) U.S. Cl.
CPC ............ *B01J 23/462* (2013.01); *B01J 37/16* (2013.01); *C01B 3/02* (2013.01); *H01M 4/921* (2013.01); *H01M 4/926* (2013.01); *H01M 8/1004* (2013.01); *C01B 2203/1064* (2013.01); *H01M 2004/8684* (2013.01)

(58) Field of Classification Search
CPC ....... B01D 2255/00; H01M 4/00; B01J 23/00; B01J 37/00; B01J 21/18; B01J 23/44; B01J 23/462; B01J 35/0033; C01B 3/00; C22C 5/04
USPC ......... 502/101, 185; 429/525, 526; 420/462, 420/463; 423/648.1, 650–652; 205/639
See application file for complete search history.

(56) References Cited

U.S. PATENT DOCUMENTS 2,471,297 A * 5/1949 Atkinson ................. B23K 1/19
228/218
3,055,840 A * 9/1962 Koch, Jr. .................. C07C 5/10
502/174
(Continued)

FOREIGN PATENT DOCUMENTS

CN    102024955-6    7/2012
CN    102906915 B    11/2015
(Continued)

OTHER PUBLICATIONS

PL-401742-A1, Description of DE 102013112288 (Year: 2014).*
Hilal Acidereli et al., "Palladium/ruthenium supported on graphene oxide (PdRu@GO) as an efficient, stable and rapid catalyst for hydrogen production from DMAB under room conditions." Renewable Energy 161, pp. 200-206. (Year: 2020).*
(Continued)

*Primary Examiner* — Patricia L. Hailey
(74) *Attorney, Agent, or Firm* — Saliwanchik, Lloyd & Eisenschenk

(57) ABSTRACT

A Pd—Ru alloy catalyst for hydrogen production and its preparation methods are provided. The catalyst can include a plurality of particles comprising an alloy of at least palladium (Pd) and ruthenium (Ru). Moreover, the catalyst can further include a support material such as carbon support having external or internal surfaces on which the plurality of particles is dispersed. The alloy catalyst can have a molar ratio of Pd:Ru in a range of about 0.5:1 to about 9:1. For hydrogen evolution reaction (HER), the Pd—Ru alloy catalyst exhibits increased catalytic activities comparing to some well-known catalysts.

3 Claims, 3 Drawing Sheets

(56) References Cited

U.S. PATENT DOCUMENTS

| | | | | |
|---|---|---|---|---|
| 3,238,700 | A | * 3/1966 | Cohn | C01B 3/505 95/56 |
| 4,460,660 | A | * 7/1984 | Kujas | H01M 4/926 429/505 |
| 5,208,207 | A | * 5/1993 | Stonehart | B01J 23/462 502/339 |
| 6,498,121 | B1 | 12/2002 | Gorer | |
| 6,818,341 | B2 | 11/2004 | Uribe et al. | |
| 6,958,138 | B1 | * 10/2005 | Devic | B01J 8/006 423/584 |
| 9,698,429 | B2 | 7/2017 | Kim et al. | |
| 2007/0026292 | A1 | * 2/2007 | Adzic | B82Y 30/00 429/424 |
| 2010/0086831 | A1 | * 4/2010 | Fisher | H01M 4/926 429/483 |
| 2011/0294038 | A1 | 12/2011 | Kwon et al. | |
| 2015/0231605 | A1 | * 8/2015 | Kitagawa | C07B 37/04 568/322 |
| 2017/0158587 | A1 | * 6/2017 | Terazono | B01J 23/6447 |
| 2017/0259247 | A1 | * 9/2017 | Kitagawa | C22C 5/02 |

FOREIGN PATENT DOCUMENTS

| | | | | |
|---|---|---|---|---|
| CN | 105431375 | A | 3/2016 | |
| CN | 10 6602085 | * | 4/2017 | B82Y 40/00 |
| DE | 102013112288 | A1 * | 5/2014 | H01M 4/8605 |
| GB | 1409260 | A * | 10/1975 | H01M 8/08 |
| GB | 1 578 913 | * | 11/1980 | C07C 85/11 |
| JP | 1993-311492 | * | 11/1993 | C25D 5/48 |
| JP | 2016-160478 | * | 9/2016 | B01J 23/46 |
| JP | 2016-160478 | A | 9/2016 | |
| JP | 2017-183242 | * | 10/2017 | H01M 4/88 |
| KR | 10-2011-0129627 | A | 12/2011 | |
| WO | WO-2000/036679 | A1 | 6/2000 | |

OTHER PUBLICATIONS

U. B. Demirci et al., "Ru-based bimetallic alloiys for hydrogen generation by hydrolysis of sodium tetrahydroborate." Journal of Alloys and Compounds 463, pp. 107-111. (Year: 2008).*

Tilman Jurzinsky et al., "Investigation of ruthenium promoted palladium catalysts for methanol electrooxidation in alkaline media." Journal of Power Sources 303, pp. 182-193. (Year: 2016).*

Xianfeng Ma et al., "Structural and morphological evaluation of Ru-Pd bimetallic nanocrystals." Materials Chemistry and Physics 173, pp. 1-6. (Year: 2016).*

Roman M. Mironenko et al., "Liquid-phase hydrogenation of benzaldehyde over Pd-Ru/C catalysts: Synergistic effect between supported metals." Catalysis Today 279, pp. 2-9. (Year: 2017).*

Elbert, K. et al., "Elucidating Hydrogen Oxidation/Evolution Kinetics in Base and Acid by Enhanced Activities at the Optimized Pt Shell Thickness on the Ru Core," *ACS Catalysis*, 2015, 5:6764-6772, American Chemical Society.

Kwon, K et al., "Performance enhancement of Pd-based hydrogen oxidation catalysts using tungsten oxide," *Catalysis Today*, 2014, 232:175-178, Elsevier B.V.

Scofield, M. E. et al., "Role of Chemical Composition in the Enhanced Catalytic Activity of Pt-Based Alloyed Ultrathin Nanowires for the Hydrogen Oxidation Reaction under Alkaline Conditions," *ACS Catalysis*, 2016, 6:3895-3908, American Chemical Society.

St. John, S. et al., "Ruthenium-Alloy Electrocatalysts with Tunable Hydrogen Oxidation Kinetics in Alkaline Electrolyte," *The Journal of Physical Chemistry*, 2015, 119:13481-13487, American Chemical Society.

Strmcnik, D. et al., "Improving the hydrogen oxidation reaction rate by promotion of hydroxyl adsorption," *Nature Chemistry*, Apr. 2013, 5:300-306, Macmillan Publishers Limited.

Wang, Y. et al., "Pt-Ru catalyzed hydrogen oxidation in alkaline media: oxophilic effect or electronic effect?" *Energy & Environmental Science*, 2015, 8:177-181, The Royal Society of Chemistry.

* cited by examiner

PALLADIUM-RUTHENIUM ALLOYS FOR ELECTROLYZERS

BACKGROUND

The increasing energy demand, environmental concerns and limited fossil fuels have triggered the development of hydrogen-based energy production as an alternative to fossil-fuel technologies. A number of cathodic reaction electrolyzers for hydrogen evolution reaction (HER) were developed for producing hydrogen.

It is well known that noble metals including Pt, Pd, Ru, Rh, Ag, and Au promote hydrogen evolution reactions from aqueous solutions of electron donors. Among noble metal promoters, platinum-based catalysts are known for achieving high catalytic efficiencies.

In some investigations, PtRu alloys were used as catalysts for hydrogen oxidation reaction (HOR) in alkaline solution; a core-shell structure including Ru as core and Pt as shell with different thickness was used for hydrogen oxidation reaction (HOR) and hydrogen evolution reaction (HER); and PtRu alloyed nanowire was synthesized for hydrogen oxidation reaction (HOR) in alkaline environment. However, the high cost of acquiring platinum hinders the widespread adoption of Pt based catalysts for electrolyzers.

In recent years, several Pd—Ru based materials as potential anode catalysts for fuel cells have been widely investigated to this effect. In Chinese patent CN105431375A, the cathode and the anode support comprise a metal nanoparticle composite comprising PdRu. In Korean patent KR20110129627A and U.S. patent application No. 20110294038A1, PdRu alloys with different metal oxides including $WO_3$ and $MoO_3$ were used as catalysts for fuel cells. In U.S. Pat. No. 6,498,121 B1 and Chinese patent CN102906915B, a ternary alloy PtRuPd was used for methanol oxidation reaction and a ternary alloy $Pd_xBi_yRu_z$ was used for HOR, respectively. Further, in Chinese patent CN102024955A, a three-dimensional mesh nano porous PdRu electrode material was synthesized by a hydrothermal method for formic acid fuel cells. In Japanese patent JP2016160478A, a PtRu alloy with metal oxide as the catalyst was used for the proton exchange membrane fuel cell (PEMFC).

Moreover, in some previously proposed investigations, the performance of PdRu alloy and PdRu—$WO_x$ composite as catalysts was evaluated for hydrogen oxidation reaction (HOR); and $Pt_xRu_y$ alloy and $Pd_xRu_y$ alloy were synthesized by using chemical-vapor-phase deposition for hydrogen oxidation reaction (HOR).

However, there is a lack of investigation on Pd—Ru based alloy catalysts as anode material for hydrogen evolution reaction (HER) of electrolyzers.

BRIEF SUMMARY

There continues to be a need in the art for improved designs and techniques for low-cost catalysts having improved catalytic activities for hydrogen evolution reaction (HER) of electrolyzers.

Embodiments of the subject invention pertain to a Pd—Ru based alloy catalyst and preparation methods thereof for hydrogen production.

According to an embodiment of the invention, the Pd—Ru based alloy catalyst can comprise a plurality of particles comprising an alloy of at least palladium (Pd) and ruthenium (Ru). The catalyst can have a molar ratio of Pd:Ru in the alloy in a range of about 0.5:1 to about 9:1. Preferably, the composition of the alloy catalyst is represented by a formula: $Pd_3Ru$. The catalyst can further comprise a support material having external or internal surfaces on which the plurality of particles of the Pd—Ru based alloy is dispersed. Preferably, the support material of the Pd—Ru based alloy catalyst is carbon support.

In another embodiment, a method for preparing the Pd—Ru based alloy catalyst is provided. The method can comprise contacting a palladium (Pd) compound and a ruthenium (Ru) compound in a solution to form a precursor; and reducing the precursor to form a catalyst comprising at least an alloy of palladium (Pd) and ruthenium (Ru). Carbon support can be added into a solvent to form carbon suspension as a protective agent and the reducing agent can comprise a $NaBH_4$ solution. In addition, the contacting of a palladium (Pd) compound and a ruthenium (Ru) compound in presence of a solvent to form a precursor can comprise mixing $PdCl_2$ and HCl to form a chloropalladic acid solution; preparing a ruthenium chloride ($RuCl_3.xH_2O$) solution; and separately dissolving sodium citrate in the chloropalladic acid solution and the ruthenium chloride ($RuCl_3.xH_2O$) solution. Moreover, the reducing of the precursor solution with a reducing agent can comprise adding the reducing agent in a dropwise manner to the precursor solution such that the alloy catalyst precursors are reduced. Furthermore, the resulting product of the reduction is filtered, cleansed, and dried to obtain the Pd—Ru based alloy catalyst.

In another embodiment, another method for preparing the Pd—Ru based alloy catalyst is provided. The method can comprise contacting palladium (Pd) dispersed on a support with a ruthenium (Ru) compound in the presence of a solvent to form a mixture; and sonicating the mixture. Moreover, the sonicated drying mixture can be dried in a water bath with stirring to form particle agglomerations; and the particle agglomerations are heated and then cooled down to obtain the Pd—Ru based alloy catalyst. In addition, the contacting palladium (Pd) dispersed on a support with a ruthenium (Ru) compound in the presence of a solvent to form a mixture can comprise dissolving Pd dispersed on carbon support and a $RuCl_3.xH_2O$ in the solvent.

In some embodiments, an electrolyzer for generating hydrogen is provided. The electrolyzer can comprise an anode comprising the Pd—Ru based alloy catalyst prepared according to the methods described above.

DETAILED DESCRIPTION

Embodiments of the subject invention pertain to multi-component palladium-ruthenium (Pd—Ru) alloy catalysts having improved catalytic activities for hydrogen evolution reaction (HER) of electrolyzers.

The following examples illustrate the subject innovation. Unless otherwise indicated in the following examples and elsewhere in the specification and claims, all parts and percentages are by weight, all temperatures are in degrees Centigrade, and pressure is at or near atmospheric pressure.

When the term "about" is used herein, in conjunction with a numerical value, it is understood that the value can be in a range of 90% of the value to 110% of the value, i.e. the value can be +/−10% of the stated value. For example, "about 1 kg" means from 0.90 kg to 1.1 kg.

Example 1

According to one exemplary embodiment of the subject invention, an electrode catalyst having a palladium-ruthenium (Pd—Ru) alloy composition can be prepared by a first method comprising following steps:
1. dissolving palladium on carbon support (Pd/C) material and $RuCl_3 \cdot xH_2O$ in a solvent and mixing to form a mixture solution;
2. sonicating the mixture solution for a first predetermined time period;
3. drying the mixture solution at a first predetermined temperature in water bath with stirring so as to form a powder;
4. heating the powder at a second predetermined temperature in an inert gas for a second predetermined time period, and
5. cooling down the powder to a third predetermined temperature.

Figure 1:
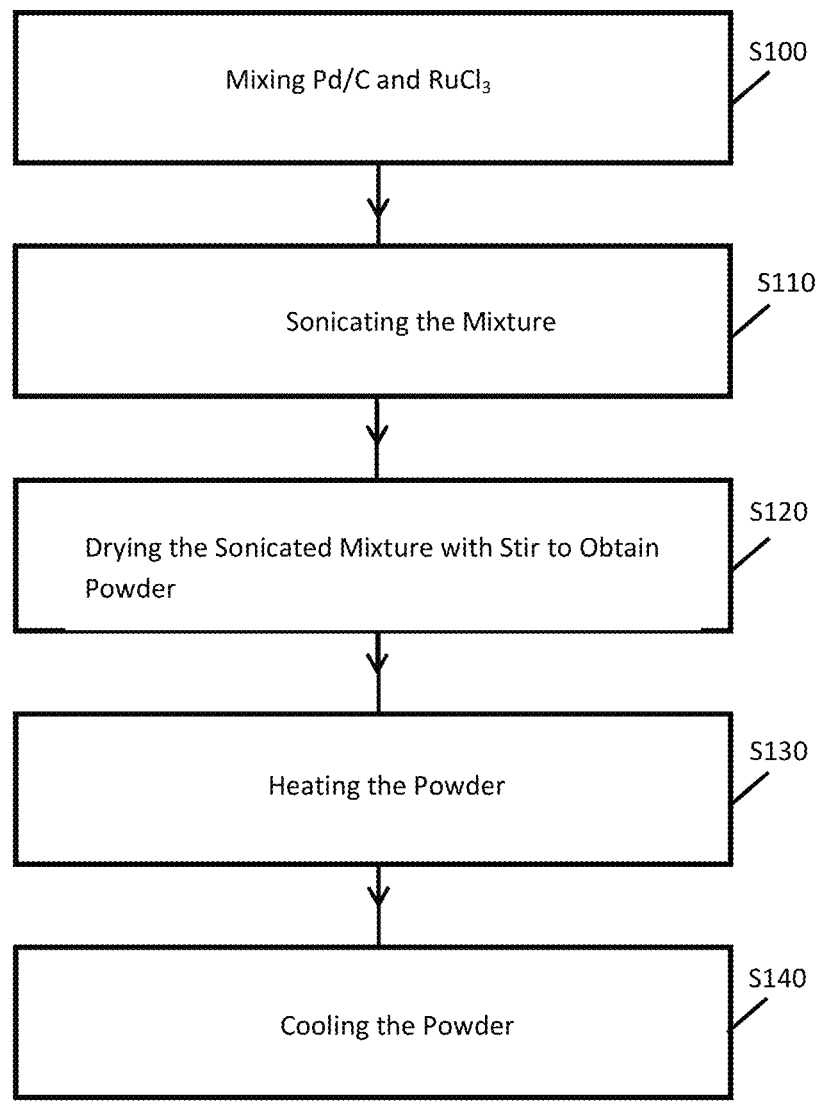
FIG. 1 is a flow diagram schematically illustrating a first method of preparing a palladium-ruthenium (Pd—Ru) alloy catalyst, according to an embodiment of the subject invention.

FIG. 1 shows an exemplary process of preparing the palladium-ruthenium (Pd—Ru) alloy catalyst for hydrogen evolution reaction (HER) of electrolyzers, according to the above described first method of an embodiment of the subject invention. Referring to FIG. 1, at step S100, 200 mg of palladium on carbon support (Pd/C) having 29.9 wt % of palladium (Pd) and 49.2 mg of ruthenium(III) chloride ($RuCl_3 \cdot xH_2O$) can be separately prepared, and then the palladium on carbon support (Pd/C) and the ruthenium (III) chloride ($RuCl_3 \cdot xH_2O$) can be dissolved in an appropriate amount of solvent, such as 250 ml of distilled water, while being mixed to form a mixture solution. It is noted that the carbon support utilized can be, for example, carbon black, Ketjen Black, graphite carbon, carbon nanotubes, ordered porous carbon, or carbon fiber.

Next, at step S110, the mixture solution from the step S100 can be subject to sonicating (for example, ultrasonic vibrations) provided by a sonication generating device for a first predetermined time period, for example, about 30 minutes, such that the mixture solution can be sonicated. Then, at step S120, the sonicated mixture solution can be dried by a drying/heating device at or near a first predetermined temperature, for example, at about 80° C., in a water bath with stirring provided by, for example a magnetic stirrer, such that the mixture solution is dried to form a powder.

Further, at step S130, the resulting powder from the step S120 can be heated in a heating device such as a tube furnace at or near a second predetermined temperature, for example at about 400° C., in an inert gas (for example, Argon gas) atmosphere for a second predetermined time period, for example about 4 hours. Then, at step S140, the powder can be cooled down to a predetermined temperature, for example at or near room temperature, for testing or characterizations.

Example 2

According to another exemplary embodiment of the subject invention, an electrode catalyst having a palladium-ruthenium (Pd—Ru) alloy composition can be prepared by a second method comprising following steps:
1. dissolving $PdCl_2$ and HCl in a solvent and mixing to form a chloropalladic acid solution;
2. preparing a ruthenium chloride ($RuCl_3 \cdot xH_2O$) solution;
3. separately dissolving sodium citrate in the chloropalladic acid solution obtained from the step 1, and sodium citrate in the ruthenium chloride solution obtained from the step 2;
4. adding carbon support such as carbon black into a solvent to form carbon suspension that acts as a protective agent;
5. adding both the chloropalladic acid/sodium citrate solution and the ruthenium chloride/sodium citrate solution obtained from the step 3 into the carbon suspension prepared in the step 4;
6. vigorously stirring the resulting carbon suspension for a first predetermined period of time to form precursors of Pd—Ru alloy catalyst;
7. adding a reducing agent such as a $NaBH_4$ solution in a dropwise manner to the stirred carbon suspension of the step 6 to reduce the precursors of Pd—Ru alloy catalyst;
8. continuing the reduction for a second predetermined period of time to form a slurry;
9. filtering the slurry from the step 8 to obtain particle agglomerations of the Pd—Ru alloy catalyst;
10. cleansing the particle agglomerations of the Pd—Ru alloy catalyst with a solvent; and
11. drying the particle agglomerations of the Pd—Ru alloy catalyst at a predetermined temperature for a third predetermined period of time.

Figure 2:
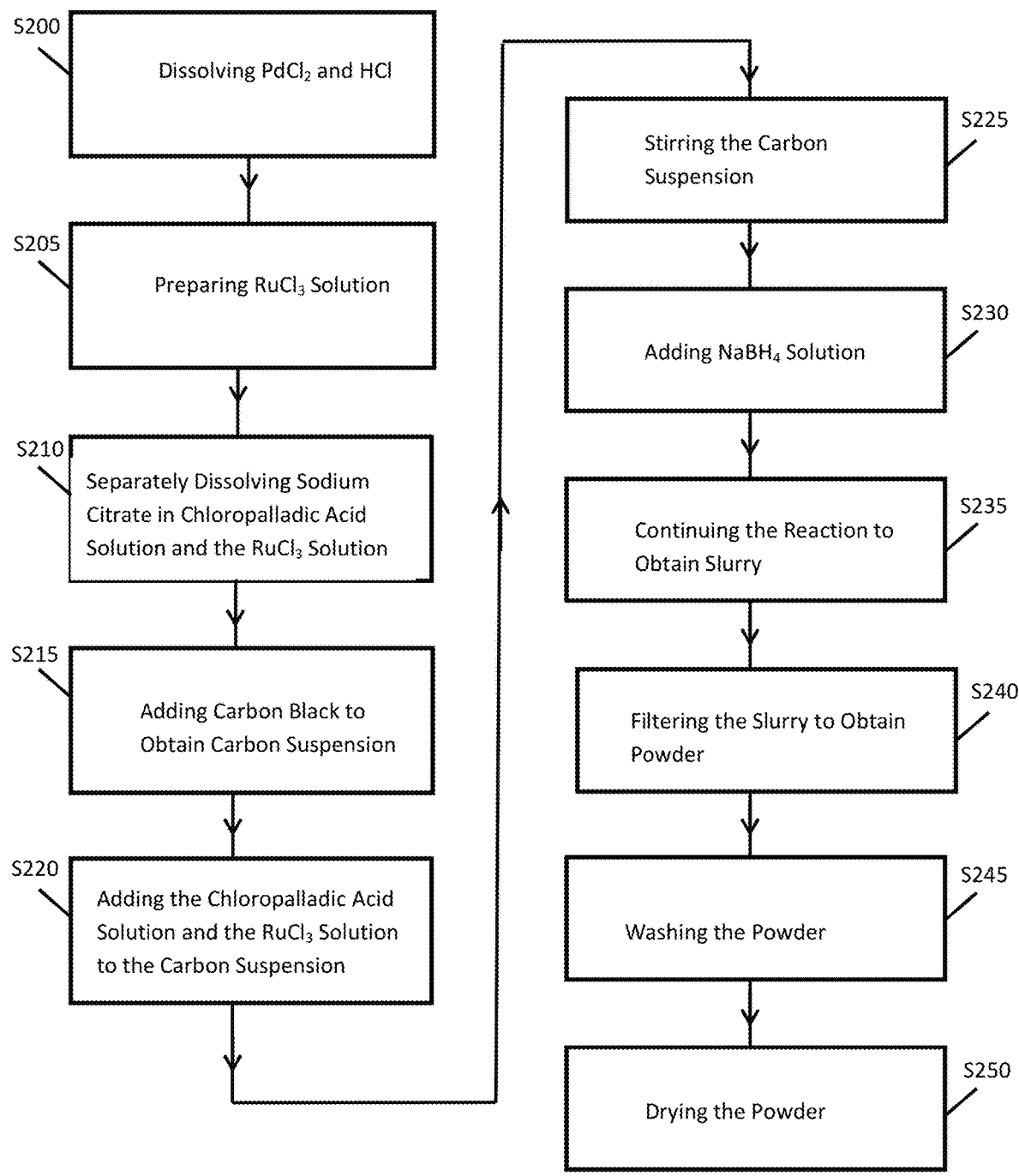
FIG. 2 is a flow diagram schematically illustrating a second method of preparing a palladium-ruthenium (Pd—Ru) catalyst, according to an embodiment of the subject invention.

FIG. 2 shows an exemplary process of preparing the palladium-ruthenium (Pd—Ru) alloy catalyst for hydrogen evolution reaction (HER) of electrolyzers, according to the second method of an embodiment of the subject invention. Referring to FIG. 2, at step S200, 0.5 g of palladium (II) chloride ($PdCl_2$) and 0.5 ml of 37 wt % hydrochloric acid (HCl) can be dissolved in an appropriate amount of solvent, such as 50 ml of distilled water, to form a 0.06 M chloropalladic acid solution.

Next, at step S205, 50 ml of a ruthenium chloride ($RuCl_3 \cdot xH_2O$) solution of 0.06 M can be prepared. Then, at step S210, 1.76 g of sodium citrate can be dissolved in the chloropalladic acid solution obtained from the step S200 and 1.76 g of sodium citrate can be separately dissolved in the ruthenium chloride solution obtained from the step S205. Further, at step S215, an appropriate amount of carbon support, such as 0.37 g of carbon black, can be added into a an appropriate amount of solvent, such as 50 ml of distilled water, to obtain carbon suspension that acts as protective agent. It is noted that the carbon support utilized can be, for example, carbon black, Ketjen Black, graphite carbon, carbon nanotubes, ordered porous carbon, or carbon fiber.

Next, at step S220, 15 ml of chloropalladic acid/sodium citrate solution and 5 ml of ruthenium chloride/sodium citrate solution both obtained from the step S210 can be added into the carbon suspension from the step S215 to form palladium-ruthenium (Pd—Ru) alloy catalyst precursors.

Then, at step S225, the carbon suspension is vigorously stirred for a predetermined period of time, for example, about 5 hours, such that the palladium-ruthenium (Pd—Ru) alloy catalyst precursors are dispersed on the internal surfaces or the external surfaces of the carbon support to permit adsorption or impregnation of the metallic compounds or their ions on or in the carbon support.

Further, at step S230, a reducing agent, for example, stoichiometric excess of 1.0 M sodium borohydride ($NaBH_4$) aqueous solution can be added in a dropwise manner (for example, by a means of titration) to the stirred carbon suspension of the step S225 to reduce the metallic catalyst material precursors.

Next, at step S235, the reduction of the metallic catalyst material precursors can be continued for a predetermined period of time, for example about 12 hours to obtain slurry. Then, at step S240, the resulting slurry can be filtered by a filtering means such as a centrifuge to obtain particle agglomerations of the palladium-ruthenium (Pd—Ru) alloy catalyst. Further, at step S245, the particle agglomerations of the palladium-ruthenium (Pd—Ru) alloy catalyst can be washed or sprayed by a solvent such as distilled water. Next, at step S250, the particle agglomerations can be dried at or near a predetermined temperature, for example about 60° C., for a predetermined period of time, for example about 12 hours.

The resulting catalyst comprising an alloy of palladium (Pd) and ruthenium (Ru) prepared by the first or second method can have a molar ratio of Pd:Ru in a range of about 0.5:1 to about 9:1. The alloy catalyst may be represented by a formula: $Pd_3Ru$. Moreover, the alloy of palladium (Pd) and ruthenium (Ru) of the catalyst can be dispersed on the external surfaces or the internal surfaces of the carbon support.

Evaluation of Catalytic Activity of Palladium-Ruthenium (Pd—Ru) Alloy Catalyst for Hydrogen Evolution Reaction (HER)

Once the palladium-ruthenium (Pd—Ru) alloy catalysts were prepared according to embodiments of the subject invention, the Pd—Ru alloy catalysts were characterized and tested for hydrogen evolution reaction (HER) to evaluate their relative catalytic activity in comparison with a conventional palladium on carbon support (Pd/C) catalyst and a conventional platinum on carbon support (Pt/C) catalyst.

In a series of hydrogen evolution reaction (HER) tests, the catalytic activities of a $Pd_3Ru$ alloy catalyst prepared according to embodiments of the subject invention were measured under the same experimental conditions as those for the conventional palladium on carbon support (Pd/C) catalyst and the conventional platinum on carbon (Pt/C) catalyst.

For hydrogen evolution reaction (HER), catalytic activity of a catalyst is defined as the maximum sustainable, or steady state, current (Amps) obtained from the catalyst, when fabricated into an electrode, at a given electric potential (Volts). Additionally, because of differences in the geometric area of electrodes, when comparing different catalysts, catalytic activity is expressed in terms of current density ($mA/cm^2$).

It is noted that in the measurements, a reversible hydrogen electrode (RHE) was used as a reference electrode and a 0.1 M potassium hydroxide (KOH) solution was used as electrolyte in all tests. Furthermore, the $Pd_3Ru$ alloy catalyst of embodiments of the subject invention, the conventional palladium on carbon (Pd/C) catalyst, and the conventional platinum on carbon (Pt/C) catalyst were all dispersed on carbon support.

Figure 3:
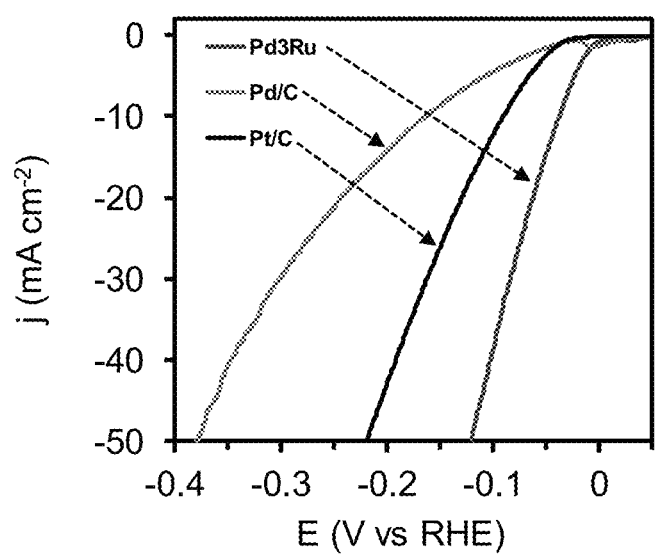
FIG. 3 shows graphs illustrating current density as a function of potential versus reversible hydrogen electrode (RHE) of (1) a $Pd_3Ru$ alloy catalyst according to an embodiment of the subject invention, (2) a conventional palladium on carbon (Pd/C) catalyst, and (3) a conventional platinum on carbon (Pt/C) catalyst, respectively, according to another embodiment of the subject invention.

Referring to FIG. 3, three plots of current densities as a function of potential E versus reversible hydrogen electrode (RHE) are shown for (1) the $Pd_3Ru$ alloy catalyst prepared according to embodiments of the subject invention, (2) the conventional palladium on carbon (Pd/C) catalyst, and (3) the conventional platinum on carbon (Pt/C) catalyst, respectively.

As illustrated by FIG. 3, when the potential E versus reversible hydrogen electrode (RHE) is changed from 0 V to about −0.12 V, the current density of the $Pd_3Ru$ alloy catalyst increases from 0 $mA/cm^2$ to about −50 $mA/cm^2$.

In comparison, when the potential is changed from 0 V to about −0.38 V, the current density of the conventional palladium on carbon (Pd/C) catalyst increases from 0 $mA/cm^2$ to about −50 $mA/cm^2$.

In further comparison, when the potential is changed from 0 V to about −0.22 V, the current density of the conventional platinum on carbon (Pt/C) catalyst increases from 0 $mA/cm^2$ to about −50 $mA/cm^2$.

Therefore, a significant enhancement of current density, for example, about 3-fold enhancement, can be accomplished, when the $Pd_3Ru$ alloy catalyst prepared according to embodiments of the subject invention is used for hydrogen evolution reaction (HER), in comparison with the conventional palladium on carbon (Pd/C) catalyst, at same given reaction conditions.

Moreover, a significant enhancement of current density, for example, about 2-fold enhancement, can be accomplished, when the $Pd_3Ru$ alloy catalyst prepared according to embodiments of the subject invention is used for hydrogen evolution reaction (HER), in comparison with the conventional palladium on carbon (Pt/C) catalyst, at same given reaction conditions.

The catalytic activity evaluation results indicate that the Pd—Ru based alloy catalyst prepared according to embodiments of the subject invention exhibits greater catalytic activity for hydrogen evolution reaction (HER) than the conventional palladium on carbon (Pd/C) catalyst or the conventional platinum on carbon (Pt/C) catalyst, at same given reaction conditions.

In another embodiment of the subject invention, the Pd—Ru alloy catalyst prepared according to embodiments of the subject invention can be used to fabricate a cathode for an electrolyzer. The electrolyzer can include an anode, a cathode having the Pd—Ru alloy catalyst and an electrolyte interposed between the anode and the cathode.

Since the prices of palladium and ruthenium are sometimes much lower than that of platinum, and the Pd—Ru based alloy catalyst prepared according to embodiments of the subject invention outperforms the conventional Pt-based catalyst in term of catalytic activity for hydrogen evolution reaction (HER), the palladium-ruthenium (Pd—Ru) alloy catalysts can significantly improve the efficiency of hydrogen evolution reaction (HER) and reduce the cost for fabricating HER based fuel cell.

The subject invention includes, but is not limited to, the following exemplified embodiments.

Embodiment 1

A catalyst for generating hydrogen, the catalyst comprising:
a plurality of particles comprising an alloy of at least palladium (Pd) and ruthenium (Ru).

Embodiment 2

The catalyst according to embodiment 1, wherein a molar ratio of Pd:Ru in the alloy is in a range of about 0.5:1 to about 9:1.

Embodiment 3

The catalyst according to embodiment 1, wherein the composition of the alloy is represented by a formula: $Pd_3Ru$.

Embodiment 4

The catalyst according to any of embodiments 1-3, further comprising a support material having external or internal surfaces on which the plurality of particles is dispersed.

Embodiment 5

The catalyst according to any of embodiments 1-4, wherein the support material comprises carbon support.

Embodiment 6

A method for making an alloy catalyst for generating hydrogen, comprising steps of:
contacting a palladium (Pd) compound and a ruthenium (Ru) compound in presence of a protective agent to form a precursor; and
reducing the precursor to form a catalyst comprising at least an alloy of palladium (Pd) and ruthenium (Ru).

Embodiment 7

The method according to embodiment 6, wherein the step of contacting a palladium (Pd) compound, and a ruthenium (Ru) compound in presence of a protective agent to form a precursor comprises:
mixing $PdCl_2$ and HCl to form a chloropalladic acid solution;
preparing a ruthenium chloride ($RuCl_3 \cdot xH_2O$) solution; and
separately dissolving sodium citrate in the chloropalladic acid solution and the ruthenium chloride ($RuCl_3 \cdot xH_2O$) solution.

Embodiment 8

The method according to any of embodiments 6-7, wherein the protective agent is prepared by adding carbon support into a solvent to form carbon suspension as the protective agent.

Embodiment 9

The method according to any of embodiments 6-8, wherein the step of reducing the precursor solution with a reducing agent comprises:
adding the reducing agent in a dropwise manner to the precursor solution such that the alloy catalyst precursors are reduced.

Embodiment 10

The method according to any of embodiments 6-9, wherein the reducing agent comprises a $NaBH_4$ solution.

Embodiment 11

The method according to embodiment any of embodiments 6-10, further comprising:
continuing the reduction for a predetermined time period.

Embodiment 12

The method according to any of embodiments 6-11, further comprising:
filtering the resulting product of the reduction.

Embodiment 13

The method according to any of embodiments 6-12, further comprising:
cleansing the filtered resulting product.

Embodiment 14

The method according to any of embodiments 6-13, further comprising:
drying the cleansed resulting product.

Embodiment 15

A method for making an alloy catalyst for generating hydrogen, comprising steps of:
contacting palladium (Pd) dispersed on a support with a ruthenium (Ru) compound in presence of a solvent to form a mixture; and
sonicating the mixture.

Embodiment 16

The method according to embodiment 15, further comprising:
drying the sonicated mixture in water bath with stir to form particle agglomerations;

Embodiment 17

The method according to any of embodiments 15-16, further comprising:
heating the particle agglomerations.

Embodiment 18

The method according to any of embodiments 15-17, further comprising:
cooling down the particle agglomerations.

Embodiment 19

The method according to any of embodiments 15-18, wherein the step of contacting palladium (Pd) dispersed on a support with a ruthenium (Ru) compound in presence of a solvent to form a mixture comprises:

dissolving Pd dispersed on carbon support and a RuCl$_3$.xH$_2$O in the solvent.

Embodiment 20

An electrolyzer for generating hydrogen, the electrolyzer comprising:
an anode material comprising the Pd—Ru based alloy catalyst according to embodiment 1.

Embodiment 21

An electrolyzer for generating hydrogen, the electrolyzer comprising:
an anode material comprising the Pd—Ru based alloy catalyst prepared according to embodiment 6.

Embodiment 22

An electrolyzer for generating hydrogen, the electrolyzer comprising:
an anode material comprising the Pd—Ru based alloy catalyst prepared according to embodiment 15.

Embodiment 23

The method according to any of embodiments 6-11, wherein the predetermined time period is about 12 hours.

Embodiment 24

The method according to embodiment 15, wherein the sonicating is performed for about 30 minutes.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

All patents, patent applications, provisional applications, and publications referred to or cited herein are incorporated by reference in their entirety, including all figures and tables, to the extent they are not inconsistent with the explicit teachings of this specification.

REFERENCES

1. Fuel cell and method for manufacturing, Kwang Hyun KIM, et al., CN105431375 A
2. Electrode catalyst for fuel cells, manufacturing method, Kyung Jung Kwon, et al., KR20110129627 A
3. Electrode catalyst for fuel cells, method of preparing the same, and fuel cell including electrode containing the electrode catalyst, Kyung Jung KWON, et al., US20110294038 A1
4. Platinum-ruthenium-palladium alloys for use as a fuel cell catalyst, Alexander Gorer, et al., US006498121 B1
5. Fuel cells, catalysts and processes, CN102906915 B
6. Three-dimensional mesh nano porous palladium-ruthenium electrode material for fuel cell and preparation method, Qingfeng Yi, et al., CN102024955 A
7. Fuel cell anode configuration for co tolerance, Francisco A. Uribe, et al., WO2000036679 A1
8. PdRu alloy electrode material and method for producing, Keiki Watanabe, et al., JP2016160478 A
9. Strmcnik, D.; Uchimura, M.; Wang, C.; Subbaraman, R.; Danilovic, N.; van der Vliet, D.; Paulikas, A. P.; Stamenkovic, V. R.; Markovic, N. M. *Nat. Chem.* 2013, 5, (4), 300-306.
10. Wang, Y.; Wang, G.; Li, G.; Huang, B.; Pan, J.; Liu, Q.; Han, J.; Xiao, L.; Lu, J.; Zhuang, L. *Energy Environ. Sci.* 2015, 8, (1), 177-181.
11. Elbert, K.; Hu, J.; Ma, Z.; Zhang, Y.; Chen, G.; An, W.; Liu, P.; Isaacs, H. S.; Adzic, R. R.; Wang, J. X. *ACS Catal.* 2015, 5, (11), 6764-6772.
12. Scofield, M. E.; Zhou, Y.; Yue, S.; Wang, L.; Su, D.; Tong, X.; Vukmirovic, M. B.; Adzic, R. R.; Wong, S. S. *ACS Catal.* 2016, 6, (6), 3895-3908.
13. Kwon, K.; Jin, S.-a.; Lee, K. H.; You, D. J.; Pak, C. *Catal. Today* 2014, 232, 175-178.
14. St. John, S.; Atkinson III, R. W.; Unocic, R. R.; Zawodzinski Jr, T. A.; Papandrew, A. B. *J. Phys. Chem. C* 2015, 119, (24), 13481-13487.

What is claimed is:

1. An electrolyzer for generating hydrogen, the electrolyzer comprising an anode material comprising a catalyst for generating hydrogen from hydrogen evolution reactions (HER), the catalyst comprising:
a plurality of particles comprising an alloy of only palladium (Pd) and ruthenium (Ru), wherein a molar ratio of Pd:Ru in the alloy is in a range of about 6:1 to about 9:1.

2. The catalyst of the electrolyzer according claim 1, further comprising a support material having external or internal surfaces on which the plurality of particles is dispersed.

3. The catalyst of the electrolyzer according claim 2, wherein the support material comprises carbon support.

* * * * *